July 28, 1931.  E. P. BOAS ET AL  1,816,465

CARDIOTACHOMETER

Filed Aug. 16, 1928

Inventors
ERNST P. BOAS,
BENJAMIN LIEBOWITZ,

By

Attorney

Patented July 28, 1931

1,816,465

UNITED STATES PATENT OFFICE

ERNST P. BOAS AND BENJAMIN LIEBOWITZ, OF NEW YORK, N. Y.

CARDIOTACHOMETER

Application filed August 16, 1928. Serial No. 299,952.

This invention relates to a device for counting the number of heart beats over a period of time and for making a permanent record of the same when desired. By this invention the number of heart beats can be determined whether the patient is still or moving around or exercising, and the total number of heart beats, as well as the rate at different moments can be determined for a period of many hours in succession when desired. Such a device may be called a cardiotachometer.

In carrying out the invention, the electrical current accompanying the contractions of the heart, known as the action current of the heart, is utilized to actuate the apparatus that registers heart beats. The action current of the heart is led off from the body by means of electrodes attached to the body. These electrodes are connected by leads to an indicating device through an amplifier that may be located some distance away from the subject so that the bodily activities of the subject are not interfered with and the total number of heart beats in a given period of time can be recorded or registered. The indicating device may be, either a counter or a recorder, or a combination of both. In order to operate commercially available forms of recording or registering devices, we interpose a relay system between the amplifier and the indicating device.

Figure 1:
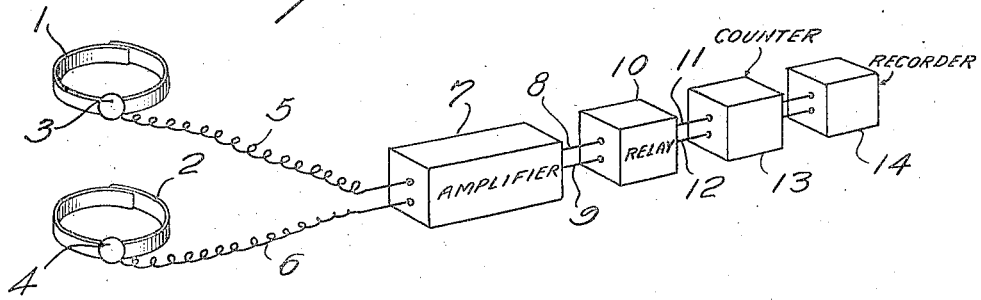
Figure 2:
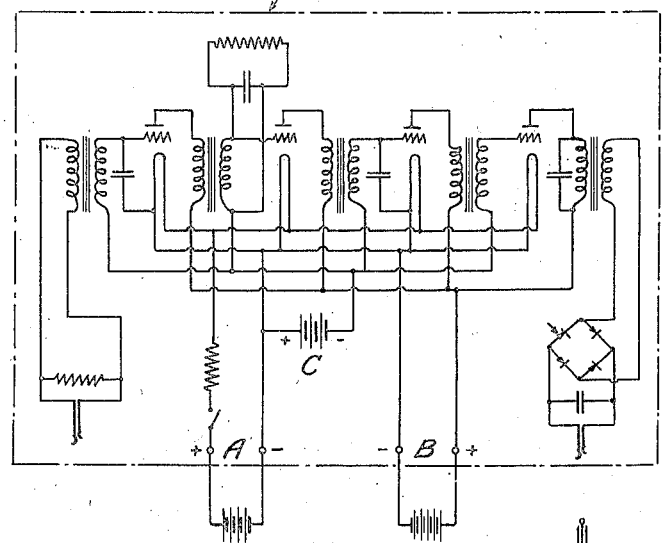
Figure 3:
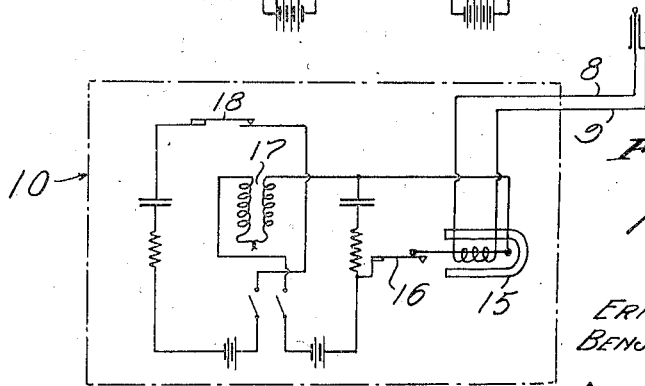

The invention will be understood from the description in connection with the accompanying drawings in which:—Figure 1 is a diagrammatic illustration of an arrangement of apparatus for carrying out the invention. Fig. 2 is a diagram showing one form of amplifier circuit; and, Fig. 3 is a diagram of one form of relay circuit. In the drawings reference characters 1 and 2 indicate bands that are preferably elastic for attaching the electrodes 3 and 4 to the body. The electrodes 3 and 4 may be made of a convenient shape and size to be applied to the desired parts of the body of the patient. It has been found preferable in most instances to place one of the electrodes in the region of the apex of the heart and the other one in the second intercostal space to the right of the sternum, since these two spots lie along the electric axis where the maximum current effect usually occurs. The electrodes 3 and 4 may be made somewhat cup-shaped and filled with ordinary green soap to provide a more intimate electric contact between these electrodes and the body. The electrodes may be about an inch in diameter. Leads 5 and 6 extend from the electrodes to an amplifier 7 that may be located at any convenient place.

It is well known that the wave form of the action current of the heart is complex, consisting usually of a main peak and several smaller peaks and ripples. The main peak should be utilized to operate the mechanism as the main peak occurs with each heart beat. A type of amplifier which has been found suitable is a multi-stage audion tube amplifier similar to that used in radio receiving sets, except that it is adapted for the relatively low frequency which characterizes the main peak of the action current. The electrical constants of this amplifier should be such as to give maximum amplification at frequencies which correspond roughly to the oscillation frequency of the main peak.

Leads 8 and 9 extend from the output side of the amplifier to a relay system diagrammatically indicated at 10. Leads 11 and 12 extend from the relay system 10 to mechanism that may either count or record the heart beats or do both. In the form illustrated the leads 11 and 12 extend to a counter 13. This counter is provided with a contact not shown by means of which a graphic recording mechanism 14 is actuated. The counter 13 shows the total number of heart beats. In the form indicated the graphic recorder 14 serves as a check on the accuracy of the counter 13.

The relay system 10 should be of the type to avoid or minimize chatter due to unsuppressed ripples in the action current of the heart or to other causes. One form of relay system which we have found to be suitable for this purpose consists of a sensitive primary relay 15 having a spring supported contact 16 and a secondary relay 17 also provided with a spring supported contact 18 and adapted to handle currents of sufficient magnitude to operate commercially available forms of counters. We have found that with this system with proper adjustment we can practically eliminate false registrations. We have also found that other means for eliminating chatter are available.

With this invention free motion of the patient and his limbs or head or other organs does not interfere with the regular signaling of the action current of the heart. The patient can indulge in calisthenic exercises, walk, run, sit, or lie down and roll over from side to side without disturbing the regular operation of the device as the heart beats are being registered. It has also been found that the patient's coughing and laughing do not interfere with the accuracy of the registration.

The response of the heart of the patient to exercise, drugs and other stimuli can be studied with this invention, and the response of the heart during exercise, rest or sleep can be accurately measured. An accurate count of the total number of heart beats in a given period of time can be observed under the conditions and activities of every-day life.

We claim:

In a device for registering heart beats, electrodes to be applied to different portions of the body, an amplifying unit adapted to amplify the maximum wave of the heart action current incident to the ventricular action occurring during each contraction of the heart, and a register operable by said maximum amplified current.

ERNST P. BOAS.
BENJAMIN LIEBOWITZ.